(12) United States Patent
Deare

(10) Patent No.: US 6,169,743 B1
(45) Date of Patent: Jan. 2, 2001

(54) INDUSTRY SPECIFIC NETWORK

(75) Inventor: Frederick L. Deare, Jeanerette, LA (US)

(73) Assignee: Oilfield Production Contractors, Inc., Houma, LA (US)

( * ) Notice: Under 35 U.S.C. 154(b), the term of this patent shall be extended for 0 days.

(21) Appl. No.: 08/922,159

(22) Filed: Sep. 2, 1997

(51) Int. Cl.$^7$ ............... H04L 1/00; H04L 12/26; G06F 15/16; G01R 31/08
(52) U.S. Cl. ............ 370/425; 709/252; 709/219; 709/244; 370/398
(58) Field of Search ............... 370/407, 408, 370/395, 397, 400, 401, 402, 396, 422, 423, 425, 398; 395/200.49; 709/244, 252

(56) References Cited

U.S. PATENT DOCUMENTS

| | | | |
|---|---|---|---|
| 4,872,157 | * | 10/1989 | Hemmady et al. ........... 370/425 |
| 5,079,760 | * | 1/1992 | Nemirovsky et al. ........ 370/397 |
| 5,850,517 | * | 12/1998 | Verkler et al. ............. 395/200.49 |

* cited by examiner

Primary Examiner—Huy D. Vu
Assistant Examiner—Kevin C. Harper
(74) Attorney, Agent, or Firm—Kean, Miller, et al.

(57) ABSTRACT

A non-public, industry-specific computer network, for interconnecting a plurality of network members across an asynchronous transfer mode (ATM) system, is provided, including a plurality of network members. Each network member includes an on-site and an off-site information server. The on-site information server of each network member is located at a site of the network member, and the off-site information server of each network member is located at an administrator site. The network also includes a dedicated, high speed ATM communication backbone interconnecting the on-site and off-site information servers of each of the network members. An administration server is located at the administrator site and is connectable to the off-site information servers of each of the network members at the administrator site. The administration server transmits data received from one network member to one or more other network members. The on-site information servers of the network members transmit and receive only industry specific data to and from other network members. When the number of network members within the network so requires, the administration server may include a plurality of data distribution hubs. A method of communicating industry-specific information between the network members is also provided.

1 Claim, 7 Drawing Sheets

INDUSTRY SPECIFIC NETWORK

BACKGROUND OF THE INVENTION

I. Field of the Invention

The present invention relates generally to secure communication networks, and more particularly to secure communications networks which enable business to be transacted within a specific industry between a plurality of diverse, non-affiliated entities via asynchronous transfer mode (ATM) independently and/or through an intermediate administrator.

II. Description of Prior Art

Developments in telecommunications over the past several years have enabled individuals and businesses to communicate information faster, more reliably and with much greater security. Conventional networking technology, such as that associated with local area networks (LANs) and wide area networks (WANs), has drastically reduced the need for transferring information by physical means. Specifically, one who wishes to transfer a particular package of information is often relieved of the need to travel to the destination of that information or to rely on third-party delivery services. Instead, most forms of information are now transferred by electronic means, such as through LAN's, WANs, modem-to-modem communication over common telephone lines, or publicly available networks, such as the Internet.

However, there are disadvantages to using each of these forms of electronic communication for certain businesses. For example, the use of LANs and WANs is essentially limited to the transfer of information within a particular organization. Employees of an organization equipped with the necessary LAN/WAN hardware and software have no difficulties moving information back and forth, regardless of distance, because such employees have "rights" to access the system. The LAN/WAN system is typically configured to permit access by those employees to certain information, and the employees having such access are presumably loyal (and perhaps contractually bound) to the employing entity in control of the network. Access to the LAN/WAN by persons or businesses outside of the control of the employer is virtually nonexistent, although special access privileges to non-employees may sometimes be granted if the need arises.

On those occasions where access to the LAN/WAN is either impossible or impermissible, persons or businesses may alternatively communicate information from one modem to another, which would also include communication by facsimile transmission, or "fax". This mode of transferring information uses conventional telephone lines, however, and many persons prefer not to communicate highly sensitive information over such lines given the risks of interception or inadvertently reaching an undesired destination.

More recently, the Internet has become the communication medium of choice for many businesses, because of the highly flexible methods it allows to transmit and retrieve information. For example, electronic mail, or "e-mail", now permits the transfer of not only the raw message itself, but also attachments of binary files of any format, as well as instant links to the World Wide Web (WWW) sites of the sender or any other person. Information can also be downloaded directly from web sites or file transfer protocol (FTP) sites. In addition to its flexibility, the Internet and the software used to browse it support a wide range of security features which allow communication of highly encrypted information, as well as the implementation of password schemes. Therefore, despite concerns over security in sending information over the Internet, it continues to provide the more flexible and secure means of communicating data in comparison to other conventional means. Some key disadvantages to the Internet, however, are that: (1) access to information can sometimes be slow, (2) Internet service providers may experience technical difficulties, and (3) there is an astonishingly vast amount of information that can distract many users from focusing on the quick and timely transfer of important day-to-day business data.

The problems which often accompany information transfer are best illustrated in the context of diverse business and governmental entities within a particular industry, such as the oil exploration and production industry. As will be appreciated, the oil industry is extremely large and there are numerous, unaffiliated businesses and governmental authorities which must interact with one another on a daily basis. For example, an offshore oil drilling or production platform must be in constant communication with mechanical and electrical supply vendors, service companies, employment agencies, engineers, miscellaneous departments of the state and federal governments, banks, and a host of other businesses. While much of the communications are accomplished through phone and fax, a significant portion is also achieved by persons physically traveling from one place to another. Due to the high frequency and volume of information that must be sent and received, as well as the often highly competitive and sensitive nature of such information, a public network such as the Internet is generally not relied upon to transfer information between these businesses and the government.

Consequently, there remains a need for a networking system, or combination of systems, having all the following features: (1) high-speed and reliable transfer of information, (2) security procedures and capabilities that ensure secure transfer of highly sensitive information, (3) the ability to transfer such information between diverse, non-affiliated entities without directly accessing the LAN/WAN networking systems of those entities, (4) the capability to communicate information with only certain network members, (5) the ability to transfer information outside of the influences of a public network, such as the Internet, and (6) a central administrator capable of handling the various requirements of each network member along with their special communication needs with respect to other network members. As will become apparent from the ensuing description, the present invention satisfies each of the above criteria to provide a networking system that allows a wide range of businesses and government to transfer critical information to one another within common industrial interests, and without necessarily being associated with the Internet.

SUMMARY OF THE INVENTION

It is therefore an object of this invention to provide an industry specific network capable of allowing secure communication of data from one server to another server.

It is also an object of this invention to provide an industry specific network which enables a first server to communicate secure data to another non-affiliated server through an intermediary administrator without the necessity of the first server granting access to the LAN/WAN of the non-affiliated server.

It is a further object of this invention to provide an industry specific network wherein data can be transferred between servers via maximum security procedures.

Still another object of this invention is to provide an industry specific network which enables multiple nonaffiliated servers to communicate unsecure data to other multiple non-affiliated servers through an intermediary administrator without the necessity of such non-affiliated servers granting access to the LAN/WANs of one another.

Yet another object of this invention is to provide an industry specific network wherein nonaffiliated servers may communicate data to one another only through dedicated ATM connections which contain no Internet traffic.

Another object of this invention is to provide an industry specific network which combines maximum transfer security of industry specific information between non-affiliated servers with the unregulated transfer of unsecure information between such non-affiliated servers.

Still another object of this invention is to provide an industry specific network which is limited to only those network members which have demonstrated a need to communicate with at least one other network member.

These and other objects and advantages of the present invention will no doubt become apparent to those skilled in the art after having read the following description of the preferred embodiment which are contained in and illustrated by the various drawing figures.

Therefore, in a preferred embodiment, a non-public, industry specific computer network, for interconnecting a plurality of network members across an asynchronous transfer mode (ATM) system, is provided, comprising a plurality of network members, wherein each network member includes an on-site and an off-site information server, wherein the on-site information server of each network member is located at a site of the network member, and wherein the off-site information server of each network member is located at an administrator site; a dedicated, high speed ATM communication backbone interconnecting said on-site and off-site information servers of each of the network members; an administration server located at the administrator site connectable to the off-site information servers of each of the network members at the administrator site, wherein the administration server transmits data received from one network member to one or more other network members; wherein the on-site information servers of the network members transmit and receive only industry specific data to and from other network members. When the number of network members within the network so requires, the administration server may include a plurality of data distribution hubs.

In a more preferred embodiment, the network is configured such that the administration server is normally disconnected from the off-site information servers, and the administration server is manually connected to one or more of the off-site information servers only at the request of the network members controlling the off-site information servers.

Additionally, the network may also be configured such that the administration server is always connected to one or more of the off-site information servers, wherein each of the off-site information servers is connected to at least one other off-site information server, wherein the connected off-site information servers are controlled by different network members, and wherein data transmitted from an on-site information server of one network member is not accessible by any other network member.

Alternatively, or in combination with the above described networking arrangements, the network may also be configured such that the administration server is connected to each of the offsite information servers, and wherein data transmitted by an on-site information server of one of the network members is accessible by all other network members.

Also provided is a method for communicating non-public, industry specific information from a first network member to a second network member, comprising the steps of transmitting industry specific data from an on-site information server located at a site of the first network member to an off-site information server located at an administrator site, wherein the industry specific data is communicated across a dedicated, high speed asynchronous transfer mode (ATM) communication backbone interconnecting the on-site and off-site information servers of the first network member; further transmitting the industry specific data from the off-site information server of the first network member to an off-site information server of the second network member located at the administrator site; and further transmitting the industry specific data from the off-site information server of the second network member to an on-site information server located at the site of the second network member, wherein the industry specific data is communicated across a dedicated, high speed asynchronous transfer mode (ATM) communication backbone interconnecting the on-site and off-site information servers of the second network member. Optionally, the preceding method may also comprise the step of transmitting the industry specific data to an administration server located at the administrator site, wherein the administration server is connected to the off-site information servers of the first network member and the second network member.

A more secure embodiment of the invention comprises a method of communicating non-public, industry specific information from a first network member to a second network member, comprising the steps of transmitting industry specific data from an on-site information server located at a site of the first network member to an off-site information server located at an administrator site, wherein the industry specific data is communicated across a dedicated, high speed asynchronous transfer mode (ATM) communication backbone interconnecting the on-site and off-site information servers of the first network member; connecting the off-site information server of the first network member to an administration server located at the administrator site; transmitting the industry specific data from the off-site information server of the first network member to the administration server; disconnecting the off-site information server of the first network member from the administration server; connecting the off-site information server of the second network member to the administration server; transmitting the industry specific data from the administration server to the off-site information server of the second network member; disconnecting the off-site information server of the second network member from the administration server; and transmitting the industry specific data from the off-site information server of the second network member to an on-site information server located at the site of the second network member, wherein the industry specific data is communicated across a dedicated, high speed asynchronous transfer mode (ATM) communication backbone interconnecting the onsite and off-site information servers of the second network member.

DETAILED DESCRIPTION OF THE PREFERRED EMBODIMENTS

Figure 1A:
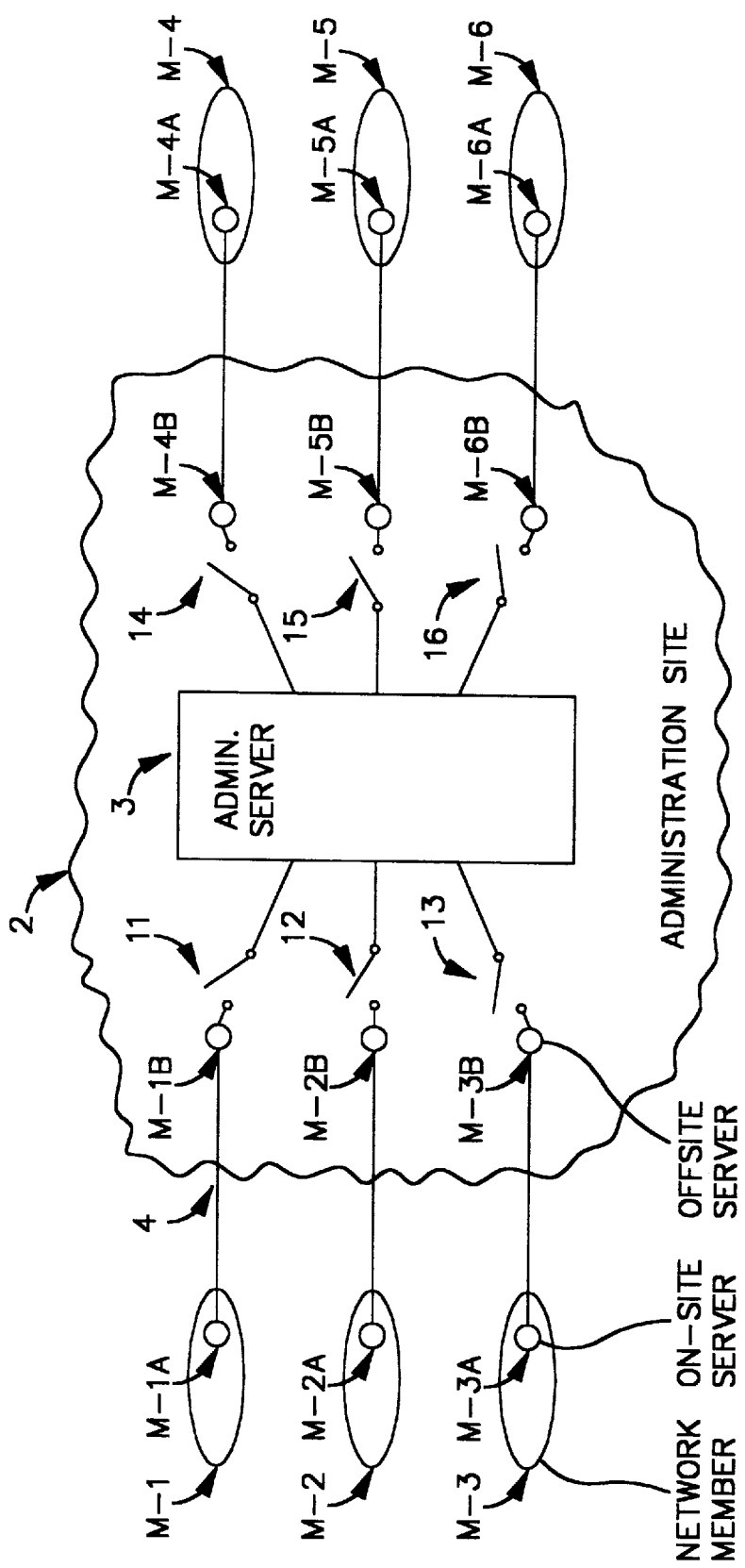
FIG. 1A is a schematic diagram of an exemplary embodiment of the SINDERNET network and its required connections and components.

Turning now to FIG. 1A, a schematic diagram of an exemplary embodiment of the present invention is shown as a secure industry network, or "Sindernet". This particular network arrangement comprises a plurality of network members M1–M6, wherein each of the network members, such as M1, includes an on-site information server, such as M1A, and an off-site information server, such as M1B. Although only six network members M1–M6 are shown, it will be appreciated that any number of network members may be a part of the present invention, provided that there are at least two such members. For reasons of convenience, the information servers of each network member, as well as any interconnective components and procedures, will be explained with reference only to network member M1. Unless otherwise specified, it will be understood that an identical arrangement exists for each of the other network members M2–M6. Likewise, use of the terms M1 and M2 to describe data transfers in the figures may be construed as an exemplary data transfer between any interconnected network members.

Furthermore, many of the components and method steps of the present invention will be described with specific relation to the oil and gas industry. As will become apparent from the ensuing description, the principles explained herein may be applied with equal success to virtually any industry wherein multiple, diverse organizations require the communication of industry-specific information to one another.

The Sindernet of FIG. 1A represents the most secure form of industry-specific network within the scope of the present invention, and it generally includes an administrator site 2 housing an administration server 3, from which connections 11–16 can be made to a plurality of local information servers M1B–M6B. As stated earlier, each of the information servers M1B–M6B which are local to the administration server 3 are referred as "off-site" information servers, because they are not located at the physical site of the network member they serve. While it is advantageous that each of the off-site information servers M1B–M6B be physically located at the administrator site 2 for maintenance purposes, it should be noted that they can alternatively be located at a different physical site than that of the administration server 3 as long as the necessary connections are established. Therefore, the boundary of the administrator site 2 shown in FIG. 1A should be regarded as the space within the control and maintenance of the network administrator, rather than as physical building extents.

Connections 11–16 between the administration server 3 and each of the off-site information servers M1B–M6B are accomplished by any means which will allow the administrator to manually connect and disconnect the administration server 3 from the off-site information servers M1B–M6B.

Using network members M1 and M2 as an example, unless a specific request is made from a network member M1 to the administrator for a transfer of information to another network member M2, there is no connection established between servers M1B and M2B, or between either of those servers with the administration server 3, which would allow data transfer.

Upon network member M1 making such a request, however, the administrator would manually establish the connection between server M1B and the administration server 3, thus enabling data transfer to the administration server 3. Once the requested information is on the administration server 3, another connection would then be established between the administration server 3 and server M2B, after which the information would be transferred to server M2B. When the requested information has been transferred to M2B, the administration server 3 is manually disconnected from server M2B.

Such manual connections 11–16 can be made through the use of a variety of conventional networking hardware commonly available to persons of ordinary skill in the networking field, such as by a single-contact or multi-contact switch. In a preferred embodiment, each server from whom and to whom information is transferred includes a directory on that server's main data storage device (such as the hard drive) which is specific to the server from which or to which information is being transferred. By way of example only, and not by way of limitation, server M1B should have a directory specific to transferring data to and from server M2B, and server M2B should have a directory specific to transferring data to and from server M1B. Once the physical connections are established, the actual data transfer may be automated by the use of "macros" or other batch programming files which authenticate the information, cause the transfer of the information, and delete the information from the transferring server immediately after each transfer is made. This arrangement further ensures that information remains secure and that it is directed only to authorized network members.

Figure 5:
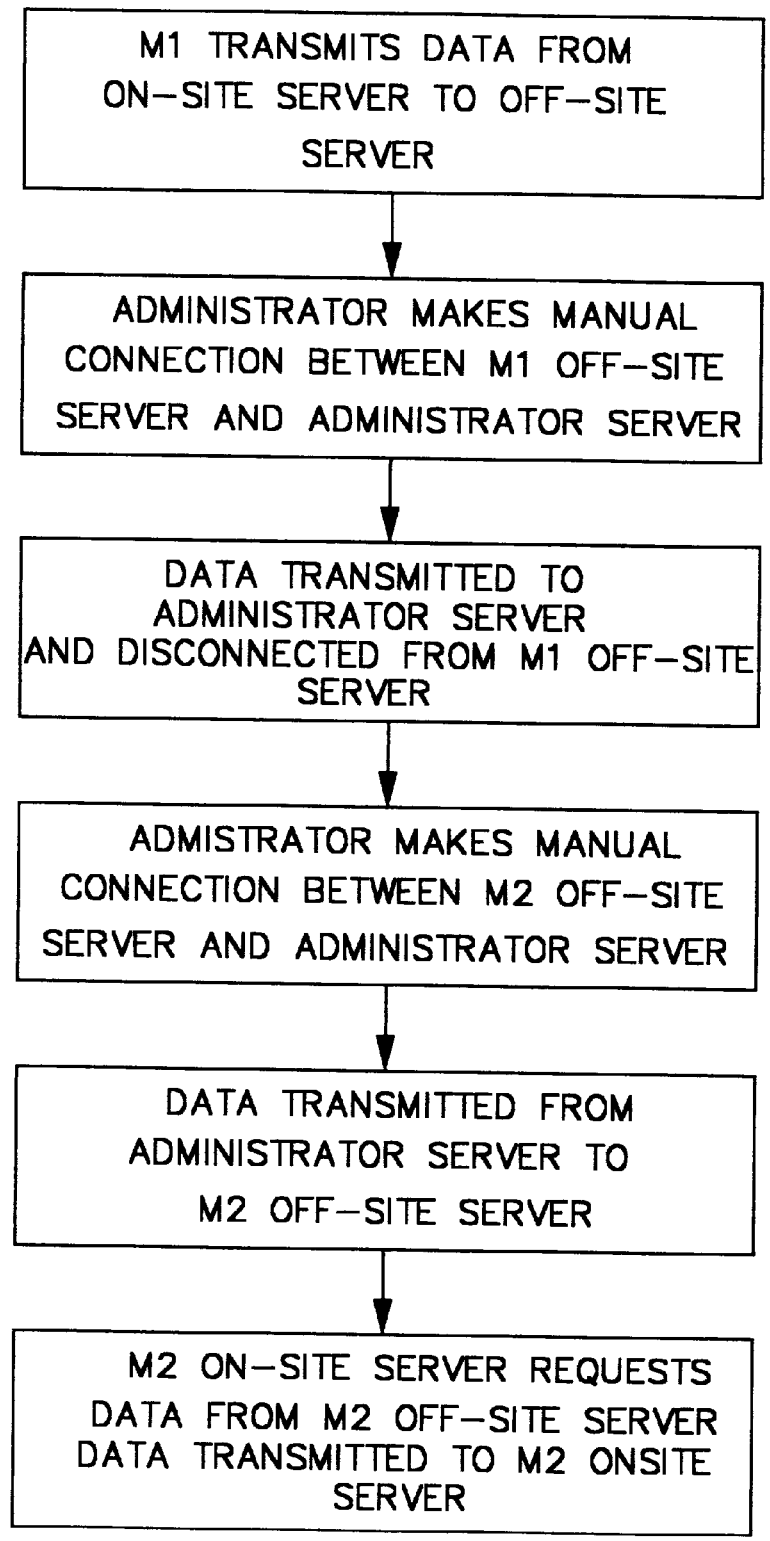
FIG. 5 is a flowchart depicting an exemplary procedure for transferring data within the SINDERNET system.

Data is transferred between the on-site information server M1A and the off-site information server M1B by way of a dedicated, high-speed asynchronous mode transfer (ATM) communication backbone 4, such as a T1 or T3 line, interconnecting servers M1A and M1B. Each high-speed line 4 cannot be accessed by any other network member, and it is controlled independently by the network member whose on-ste and off-site information servers are interconnected. A flowchart of the information transfer process within the Sindernet is depicted in FIG. 5.

Because of the security features of the connections in the Sindemet, network members are able to transmit and receive highly sensitive, industry-specific data to one another. For example, in the case of the oil and gas industry, confidential information concerning well productivity, drawings, morning reports, inter-office correspondence, and similar information may be communicated via the above Sindernet arrangement so that such information can be reviewed by the necessary persons without the need for expensive and time-consuming traveling.

Figure 1B:
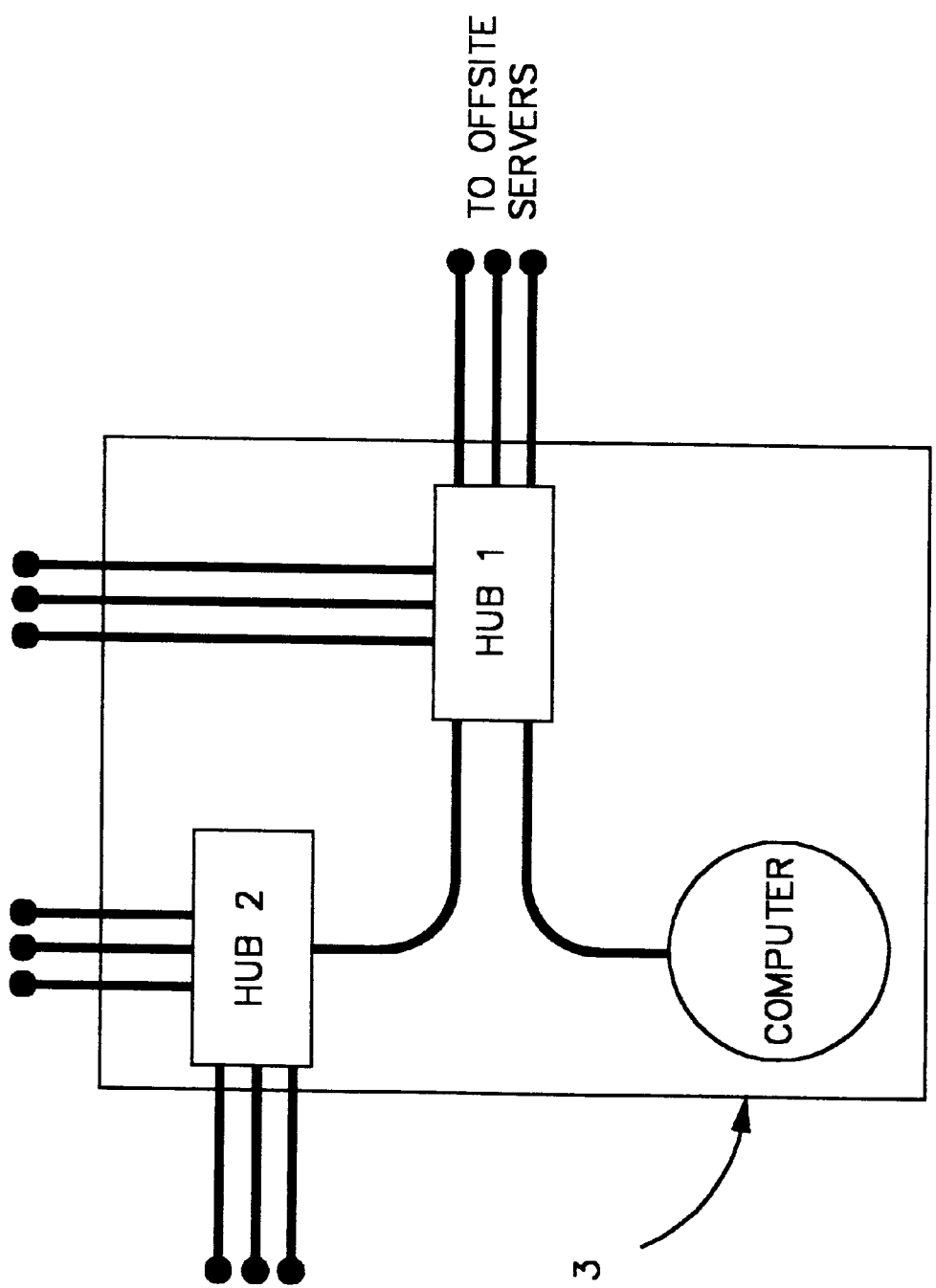
FIG. 1B is a schematic diagram of one embodiment the administrative server, depicting the use of multiple hubs.

FIG. 1B is a schematic diagram of one embodiment the administration server 3, depicting the use of multiple hubs HUB1 and HUB2. Use of multiple hubs may be necessary in the event that the number of network members exceeds the capacity of the administrative server 3. In such a configuration, the required components of the Sindernet, as well as the process of transferring data to and from network members remains identical.

Figure 2:
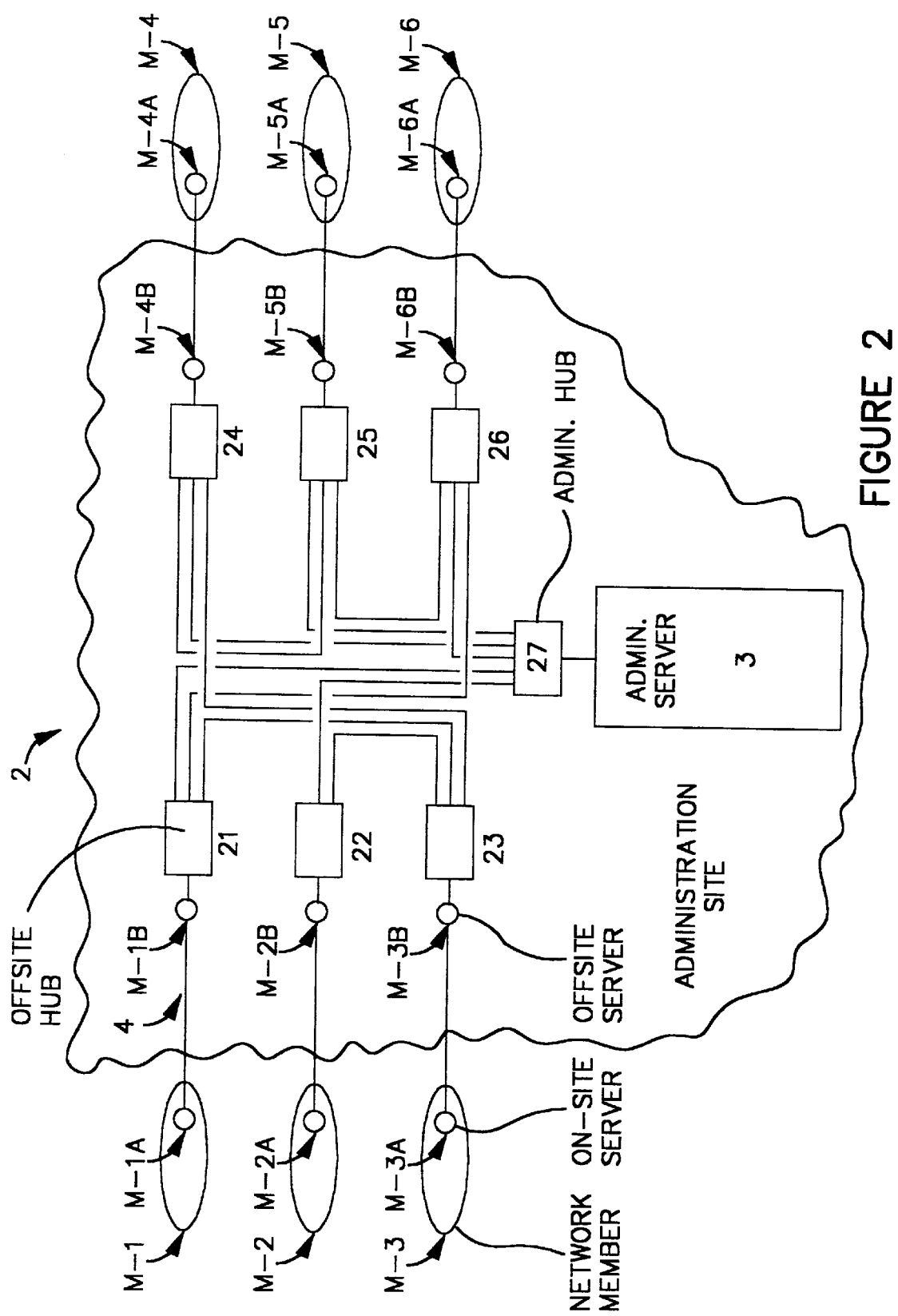
FIG. 2 is a schematic diagram of an exemplary embodiment of the SPINDERNET network and its required connections and components.

FIG. 2 is a schematic diagram depicting an exemplary embodiment of an alternative form of industry-specific network which is less secure than the Sindernet previously described, and which is referred to herein as the "Spindernet" network. In this embodiment, a network member M1 includes an off-site information server M1B that is always connected to a hub 21, from which a plurality of connections to other off-site information servers of other network members may be made. Optionally, each off-site information server M1B–M6B may also be connected to the hub 27 of the administration server 3. For example, in FIG. 2, the following connections are shown: server M1B is connected to hub 27, server M3B and server M6B; server M2B is connected to hub 27 and server M3B; server M3B is connected to server M1B, server M2B, and server M4B; server M4B is connected to hub 27, server M3B, and server M5B; server M5B is connected to hub 27, server M4B, and server M6B; and server M6B is connected to hub 27, server M5B, and server M1B. As can be seen, the Spindernet is essentially characterized by the administration server 3 being always connected to at least one other network member, and wherein each network member is always connected to at least one other network member. Network members are free to establish connections only with the those other network members with whom they need to do business. Using the oil and gas industry as one example, an oil production company M1 may require access to four (4) material supply vendors, two (2) operations contractors, and one (1) engineering company. Therefore, the off-site information server M1B would be connected to a total of seven (7) other off-site information servers, each owned and controlled by their respective network members.

Figure 6:
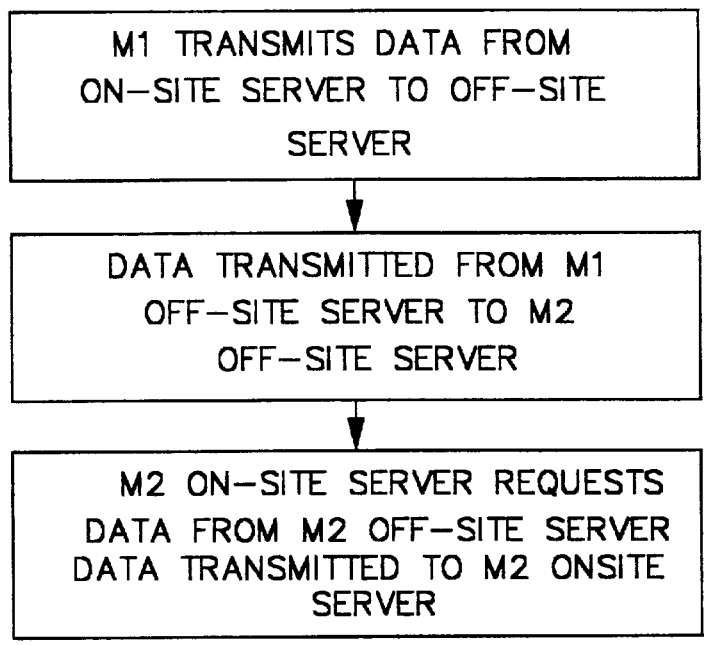
FIG. 6 is a flowchart depicting an exemplary procedure for transferring data within the SPINDERNET system.
Figure 7:
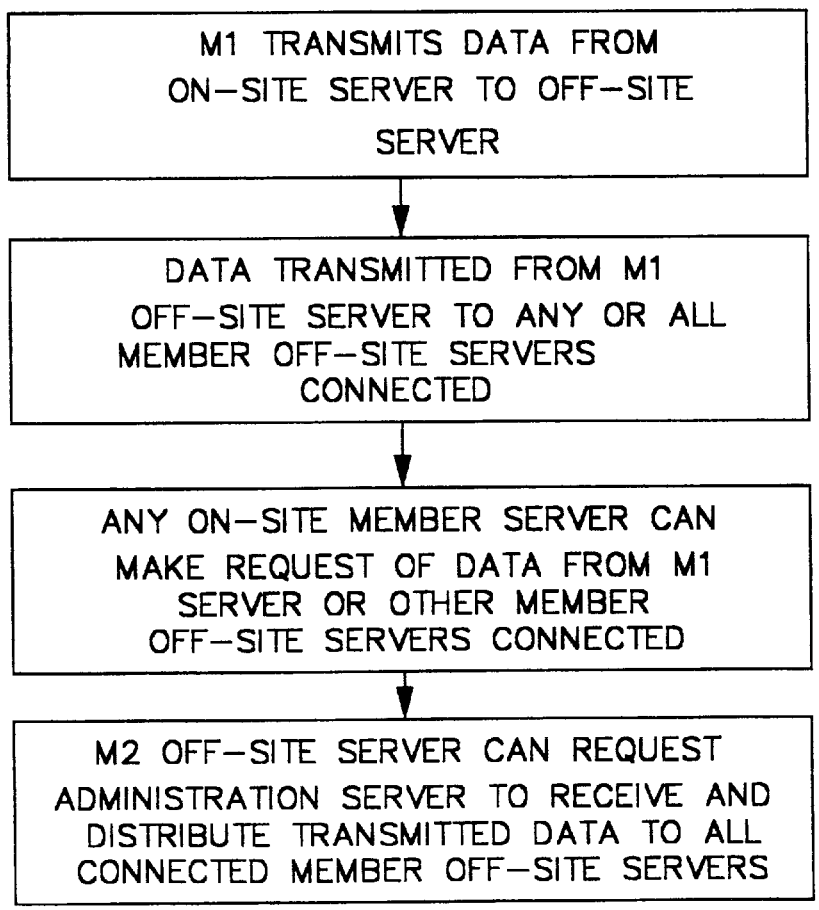
FIG. 7 is a flowchart depicting an exemplary procedure for transferring data within the INDERNET system.

In the Spindernet arrangement, the involvement of the administration server 3 is optional with each network member. Even if the network member is connected to the administration server 3, the administration server 3 does not involve itself with any actual data transfers. By example using network members M1 and M6, on-site information server M1A transmits data to its corresponding off-site information server M1B. The data is then transferred from server M1B directly to the off-site information server M6B. On-site information server M6A then requests the data from server M6B, whereupon the date is transmitted to server M6A. A flowchart of the data transfer process within the Spindernet is depicted in FIG. 6.

Figure 3:
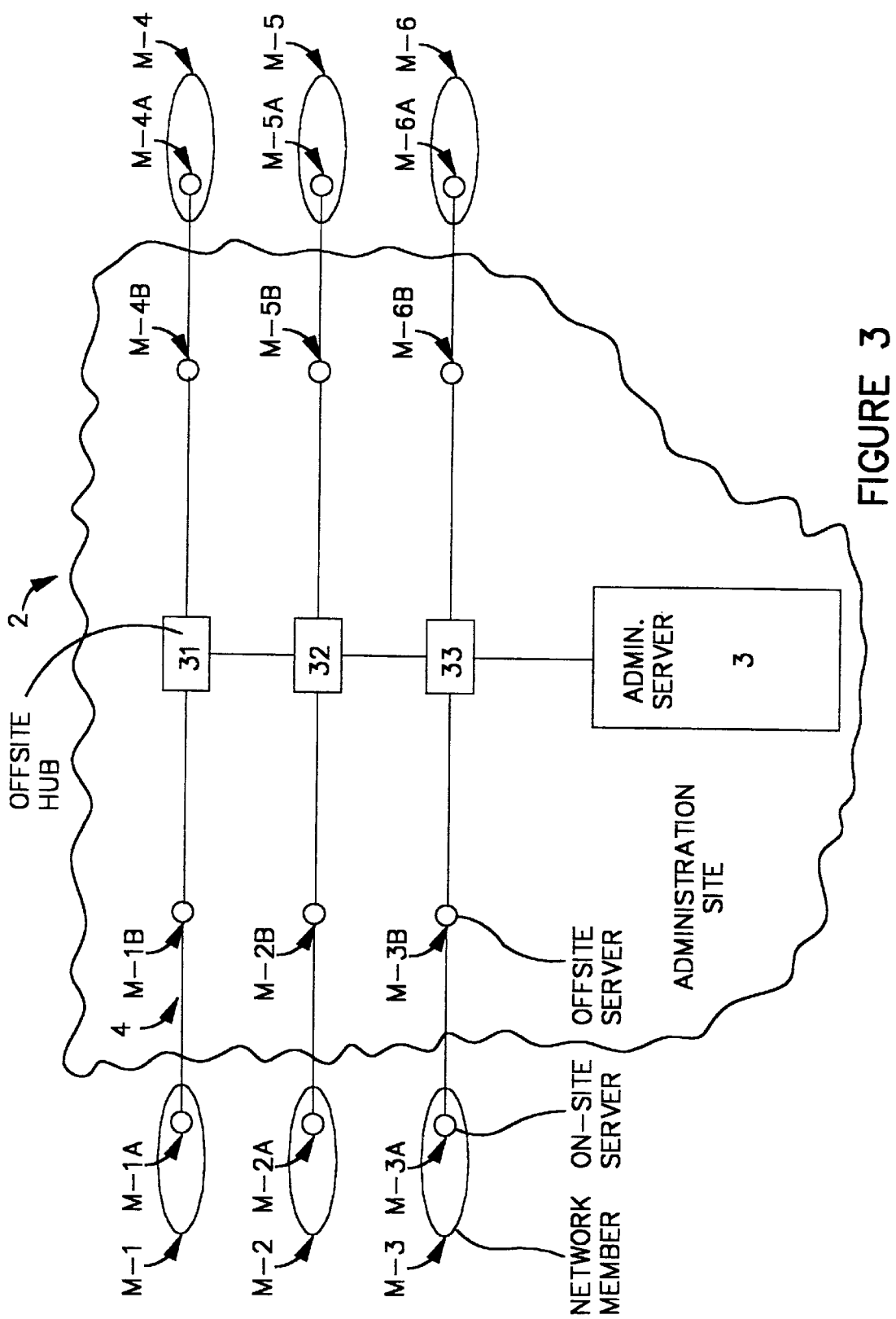
FIG. 3 is a schematic diagram of an exemplary embodiment of the INDERNET network and its required connections and components.

FIG. 3 is a schematic diagram of a further alternative industry-specific network, less secure than both the Sindernet and Spindernet arrangements, which is referred to herein as an "Indernet" network. At all times, the network members M1–M6 are connected to the administration server 3, as well as to each other through one or more interconnected hubs 31–33.

The Indernet finds it greatest utility in providing helpful, non-confidential and industry-specific information to all of the network members connected to the Indernet. One example of such information might be the publication of schedules of supply vessels along with their availability for shipment of certain required materials. Although this type of information is generally not appropriate for dissemination across a public network, such as the Internet, it is ideal for the Indernet arrangement, because only network members would have access to such information.

Figure 4:
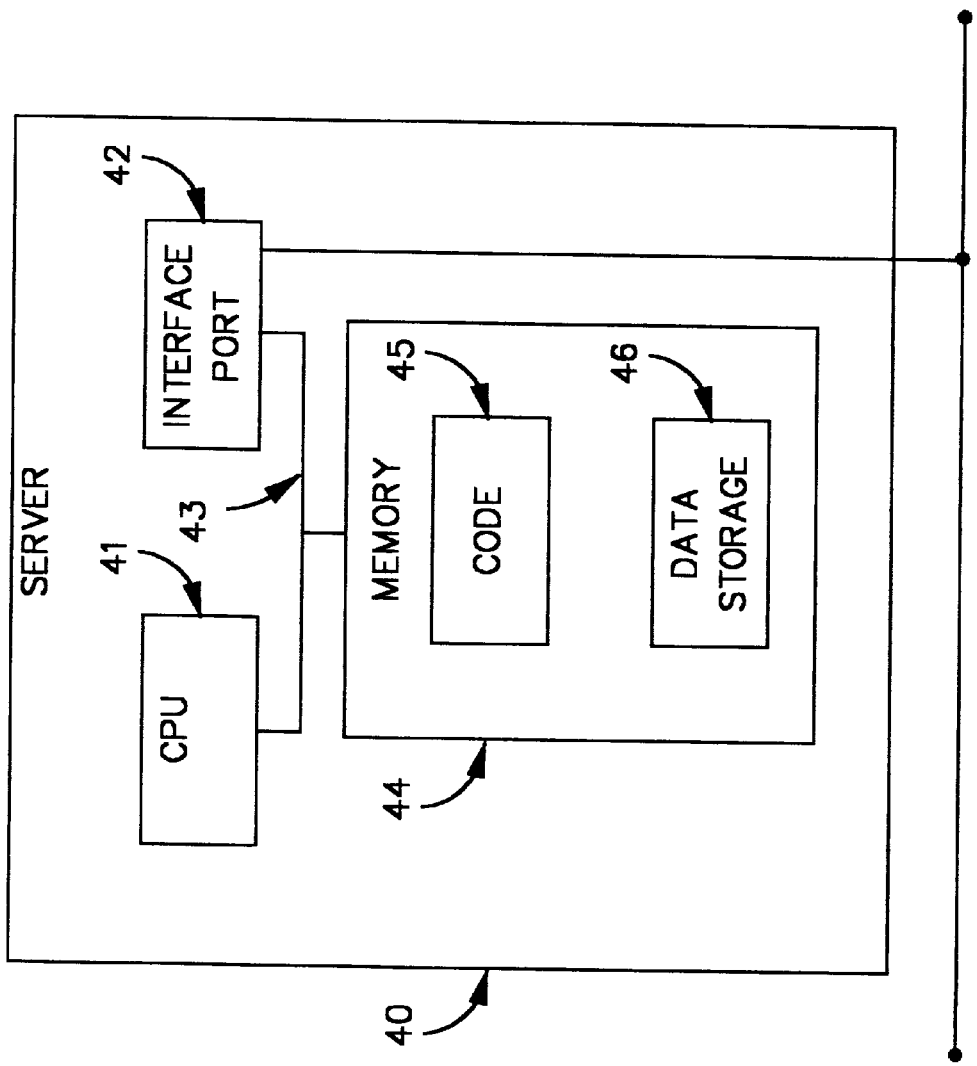
FIG. 4 is a schematic diagram of an exemplary server which can be used in conjunction with the aforementioned network arrangements.

FIG. 4 is a schematic diagram of an exemplary server which can be used in conjunction with any of the aforementioned network arrangements, such as the administration server 3 or any of the on-site or off-site information servers. Each server 40 includes a central processing unit (CPU) 41, an interface port 42, a data bus 43, and memory 44. CPU 41 provides all the computational capability necessary to control the processes of server 40. Data bus 43 provides for the exchange of data between the internal components of server 40. Interface port 42 provides for the exchange of data between server 40 and devices external to server 40 via the high-speed ATM backbone 4. For these purposes, interface port 42 contains, for example, well-known data transceivers. Memory 44 includes a code portion 45, which contains the instructions used by the CPU 41 to control the processes of server 40, such as those described herein above, and data storage portion 46 which contains the information necessary to the server 40 to perform its specific functions, such as configuration and address information about other servers to and from which required data may be transferred.

It should finally be noted that the foregoing network embodiments may be combined, or "overlayed" on top of one another, creating a unique, multi-function, industry-specific network which ideally suits the diverse needs of each network member. For example, one network member may require the Sindernet features as well as the Indernet features, while another network member may only require those services of the Spindernet and the Indernet. Thus, all three networking arrangements may exist concurrently within the administrator site 2, and each network member may be connected to multiple networking arrangements. Advancements in software and network communication hardware for the Internet are directly available for use in connection with the foregoing industry-specific networks, particularly in terms of so-called web browsers and programming languages used to create and maintain web pages. Therefore, the versatility of the present invention in meeting the specific needs of industry participants should be greatly enhanced by its ease of use due to the incorporation of familiar interfaces and operating procedures.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of communicating non-public, industry specific information from a first network member to a second network member, comprising sequential the steps of:

(a) transmitting industry specific data from a single on-site information server located at a site of said first network member to a single off-site information server located at an administrator site, wherein said industry specific data is communicated across a dedicated, high speed asynchronous transfer mode (ATM) communication backbone interconnecting said single on-site and single off-site information servers of said first network member;

(b) connecting said single off-site information server of said first network member to an administration server located at said administrator site;

(c) transmitting said industry specific data from said single off-site information server of said first network member to said administration server;

(d) disconnecting said single off-site information server of said first network member from said administration server;

(e) connecting said single off-site information server of said second network member to said administration server;

(f) transmitting said industry specific data from said administration server to said single off-site information server of said second network member;

(g) disconnecting said single off-site information server of said second network member from said administration server; and (h) transmitting said industry specific data from said single off-site information server of said second network member to a single on-site information server located at the site of said second network member, wherein said industry specific data is communicated across a dedicated, high speed asynchronous transfer mode (ATM) communication backbone interconnecting said single on-site and single off-site information servers of said second network member.

* * * * *